June 14, 1966          A. TANGEN          3,255,840
MOTOR VEHICLE WITH FOUR DRIVEN AND STEERED WHEELS
Filed Aug. 8, 1962          4 Sheets-Sheet 1
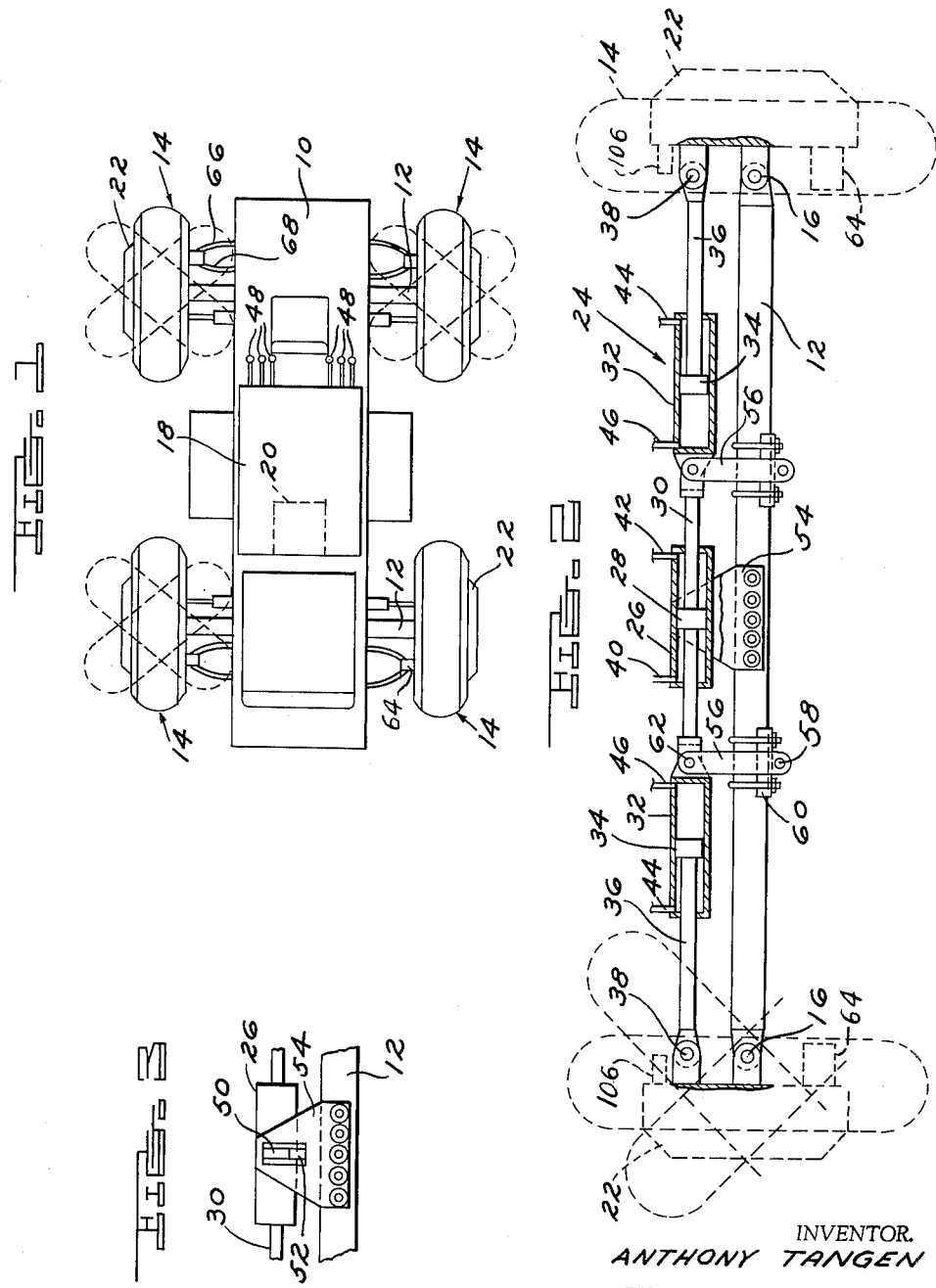
INVENTOR.
ANTHONY TANGEN
BY
Barnes, Kisselle, Raisch & Choate
ATTORNEYS

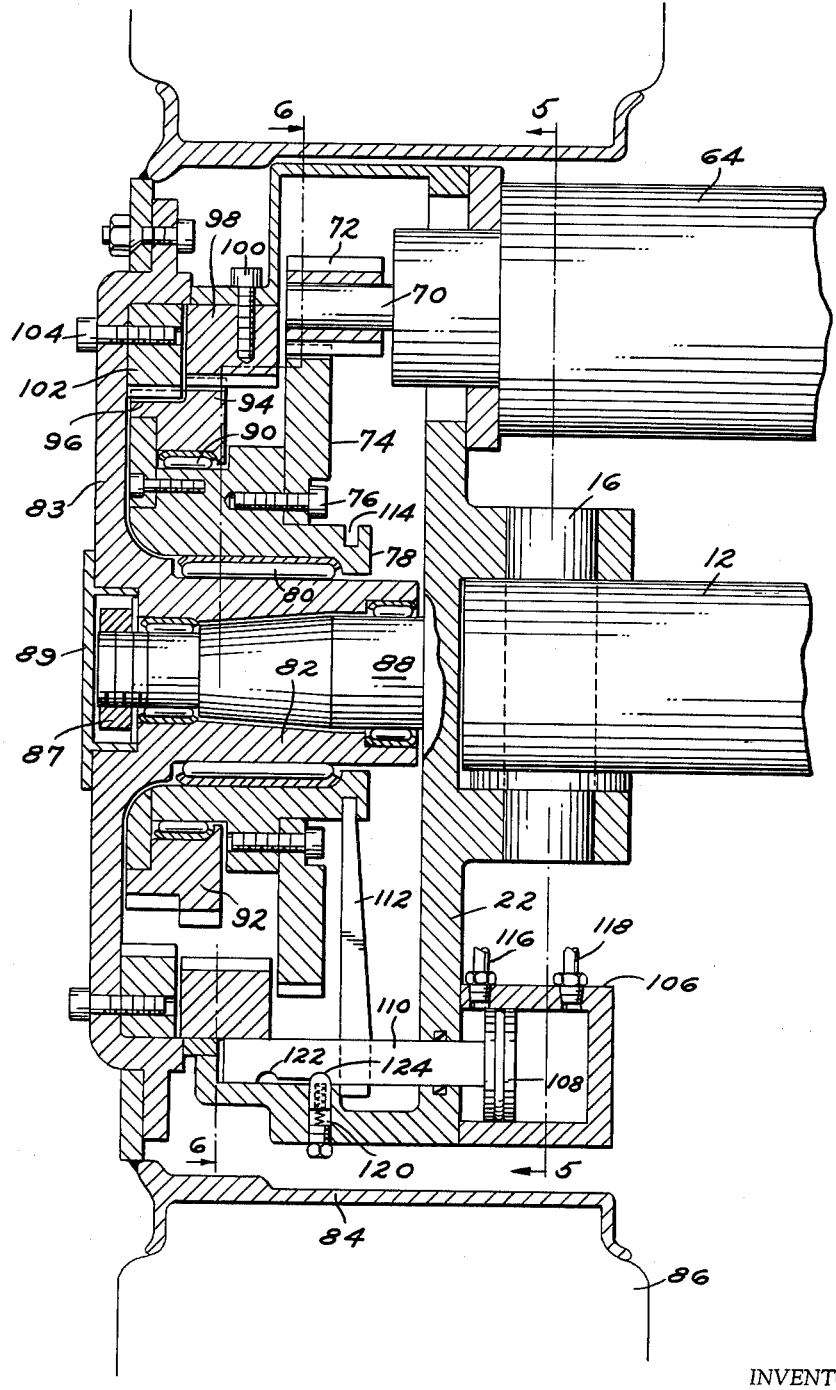

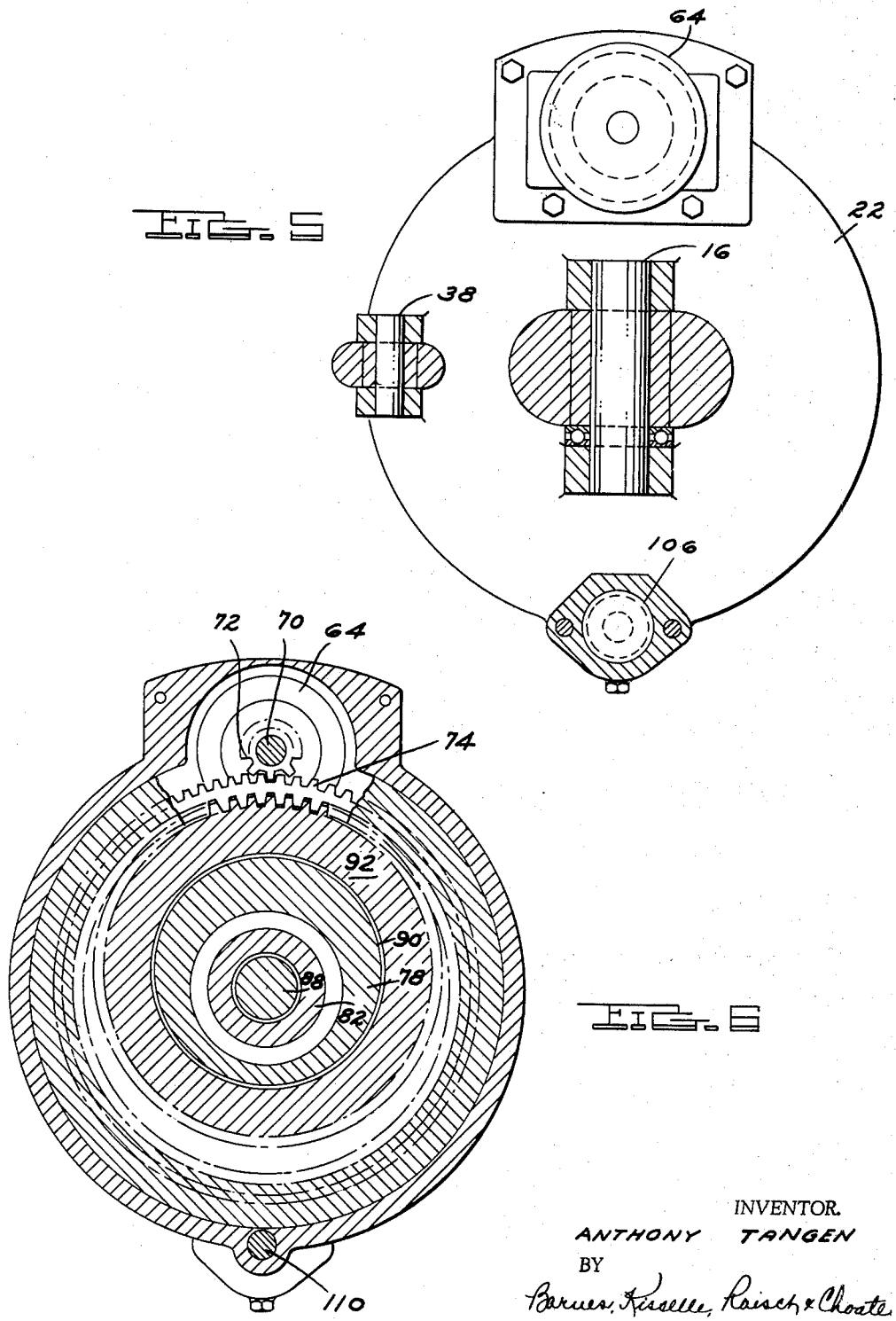

June 14, 1966 A. TANGEN 3,255,840
MOTOR VEHICLE WITH FOUR DRIVEN AND STEERED WHEELS
Filed Aug. 8, 1962 4 Sheets-Sheet 4
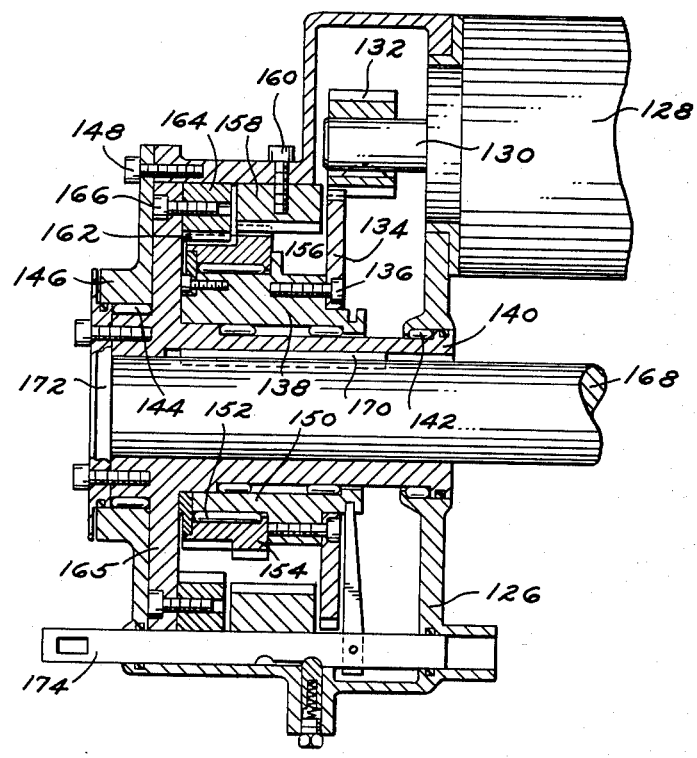
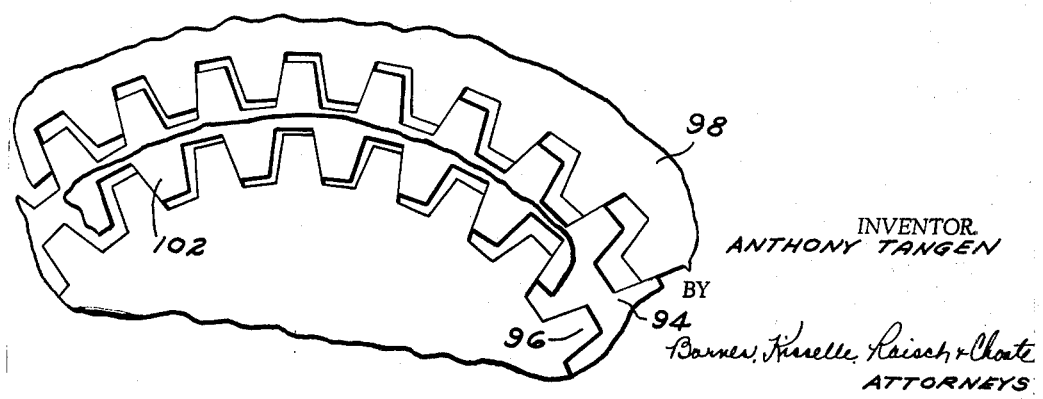
INVENTOR.
ANTHONY TANGEN
BY
Barnes, Kisselle, Raisch & Choate
ATTORNEYS 3,255,840
MOTOR VEHICLE WITH FOUR DRIVEN AND
STEERED WHEELS
Anthony Tangen, 14235 Winthrop, Detroit, Mich.
Filed Aug. 8, 1962, Ser. No. 215,682
3 Claims. (Cl. 180—45)

This invention relates to a motor vehicle and more particularly to a motor vehicle of the heavy-duty type such as used for fork lift trucks, graders, loaders, cranes, etc.

Vehicles of the heavy-duty type such as enumerated above usually require high power and low speed. These requirements are usually met by having a power plant of sufficient size mounted on the vehicle chassis and connected with the drive axles of the vehicle. However, when the power plant is connected to the drive wheels through live axles, the degree of turning of the wheels is limited by problems of mechanical design and the maneuverability of the vehicle is accordingly limited to less than desired.

It is an object of the present invention to provide a vehicle of the heavy-duty type that is easily maneuverable. This object is accomplished by mounting a driving motor on each wheel assembly, the driving motor being itself driven from the power plant through flexible connections and mounting the wheels on the chassis of the vehicle so that the two wheels on each axle can be turned for steering a maximum extent in either the same or opposite directions. By having each wheel independently driven, the problem of having steerable wheels connected to live axles is eliminated and the maneuverability of the vehicle is thus limited only by the mechanical limitations of the steering arrangement.

In the drawings:

FIG. 1 is a plan view of a vehicle in accordance with the present invention.

FIG. 2 is a top plan view of one of the axle assemblies of the vehicle with the steering arrangement of the present invention.

FIG. 3 is a fragmentary elevational view showing the connection between the main cylinder of the steering arrangement with the axle.

FIG. 4 is a fragmentary sectional view of the drive motor on each wheel.

FIG. 5 is a sectional view along the line 5—5 in FIG. 4.

FIG. 6 is a sectional view along the line 6—6 in FIG. 4.

FIG. 7 is a sectional view of a modified form of drive motor.

FIG. 8 is a fragmentary generally diagrammatic view of a portion of the gear drive.

The vehicle illustrated in FIG. 1 includes chassis 10 having two fixed axles 12 on which wheels 14 are pivotally supported as by the pivotal connection 16 (FIGS. 1 and 4). On the chassis 10, a suitable power plant 18 is mounted, the power plant including a hydraulic pump 20. Each wheel includes a housing 22 which includes a hydraulically driven gear motor described hereinafter for driving each wheel.

The steering arrangement for the wheels is best illustrated in FIG. 2. The two wheels on each axle are interconnected by a tie rod linkage generally designated 24. This linkage comprises a main hydraulic cylinder 26 in which is arranged a piston 28 on a piston rod 30 which projects outwardly from opposite ends of cylinder 26.

An auxiliary cylinder 32 is supported at each end of piston rod 30. Within each cylinder 32, there is slidably arranged a piston 34 connected to a piston rod 36 having its free end pivotally connected to the wheel housing 22 as at 38. The main cylinder 26 has its opposite ends connected to pump 20 by means of hydraulic lines 40, 42. The auxiliary cylinders 32 have their opposite ends connected to motor driven pump 20 by hydraulic lines 44, 46. Suitable valve control rods 48 are provided on the control panel of power plant 18 for selectively controlling the flow of a hydraulic fluid under pressure to the various cylinders described.

Cylinder 26 is fashioned with a radially projecting lug 50 on opposite sides thereof and these lugs project into vertically elongated slots 52 formed in plates 54 fixedly mounted on opposite sides of axle 12 at the center thereof. Lugs 50 cooperate with slots 52 to prevent cylinder 26 from shifting lengthwise of the axle. Nevertheless, lugs 50 cooperate with slots 52 to permit the linkage 24 to shift toward and away from the axle under the control of radius links 56. Links 56 are pivotally connected at one end as at 58 to brackets 60 fixedly mounted on axle 12. At their opposite ends, the links 56 are pivotally connected as at 62 to the connection between the opposite ends of piston rod 30 and cylinders 32.

With this steering arrangement, it will be appreciated that the two wheels on each axle can be turned in unison in the same direction or in opposite directions. For example, the wheels 14 in the straightaway position are generally parallel as shown in solid lines in FIG. 1 and in this position, the various elements of the steering mechanism occupy the relationship illustrated in FIG. 2. Now, if it is desired to turn both wheels on either axle in the same direction, then the proper control lever 48 is actuated to admit hydraulic fluid under pressure to either hydraulic line 40 or hydraulic line 42 and thus shift piston 28 in cylinder 26 in either one direction or the other. This causes the linkage 24 as a whole to be shifted transversely of the vehicle and the two wheels on the same axle will be rotated about their pivoted supports 16 in the same direction. On the other hand, it may be desired to turn the two wheels on either or both of the axles in opposite directions. In this instance, the proper control lever 48 is manipulated to introduce hydraulic fluid to the cylinders 32 either at their outer ends through hydraulic lines 44 or at their inner ends through hydraulic lines 46.

The maneuverability of the vehicle with the steering mechanism described on each axle should be readily apparent. For example, the vehicle can be turned about its own axis as a center by turning both front wheels inwardly and both rear wheels outwardly. As another example, the vehicle can be caused to travel a path oblique to its longitudinal axis by turning all four wheels to parallel positions oblique to the longitudinal axis of the vehicle. In this arrangement, it will be appreciated that the extent to which 14 can pivot about its pivot support 16 is limited only by the mechanical limitations of the linkage 24.

The steering arrangement described above is made possible by the fact that each wheel 14 is provided with its own drive motor within housing 22. The preferred form of drive motor is illustrated in FIG. 4. On the back or inner face of each housing 22, there is mounted a hydraulic motor 64 which is connected to pump 20 by hydraulic lines 66, 68 (FIG. 1). The shaft 70 of motor 64 fixedly mounts a drive gear 72 which meshes with a larger gear 74. Gear 74 is mounted as by screws 76 to a shaft in the form of a sleeve 78. Sleeve 78 is in turn journalled by bearings 80 on the wheel hub 82. The wheel hub 82 is integral with the wheel body 83 which supports the demountable wheel rim 84 in which the rubber tire 86 of the wheel is mounted. Hub 82 is in turn journalled on a spindle 88 projecting from and within housing 22 coaxially with axle 12. Wheel body 83 is retained on spindle by a nut and lock washer assembly 87 enclosed by a cap 89.

Sleeve 78 has an outer cylindrical portion 90 which is eccentric relative to the axis of spindle 88. On this eccentric portion 90, there is journalled a sun gear 92 having gear portions 94 and 96. Gear portion 94 has a larger diameter than gear portion 96 and meshes with a stationary internal gear 98 which is fixedly mounted on housing 22 as by screws 100. Gear portion 96 of gear 92 meshes with an internal gear 102 fixedly mounted on wheel body 83 by screws 104. It will be observed that the diameter of gear 92 is substantially less than the internal diameters of gears 98 and 102. Thus, the meshing relationship of these gears is only locally. The gear ratio between the gear portion 94 of gear 92 and the teeth of gear 98 is different from the gear ratio between the gear portion 96 of gear 92 and the teeth of gear 102. Thus, with the gears arranged as shown in FIG. 4, when the hydraulic motor 64 is energized, sleeve 78 is rotated about the axis of spindle 88. Rotation of sleeve 78 causes the sun gear 92 to revolve about the eccentric portion 90 of sleeve 78 in meshing relationship with gears 98 and 102. Since the gear ratios previously referred to are different, as gear 94 revolves in meshing relationship with gear 98, gear 102 is caused to rotate (FIG. 8). However, the speed of rotation of gear 102 relative to the fixed gear 98 will be relatively low in the embodiment illustrated because the gear ratios are not widely different. At the same time, it will be appreciated that the driving torque exerted on the wheel will be relatively high by reason of the design of this gear motor.

Suitable means may be provided for operably connecting and disconnecting the gear drive between gear portion 96 of sun gear 92 and the driven gear 102 on the wheel. In this embodiment illustrated, this is accomplished by a hydraulic cylinder 106 on housing 22 which houses a piston 108, the rod 110 of which projects into housing 22. A shifter fork 112 fixed on rod 110 has its free end engaged within a circumferential groove 114 on sleeve 78. Hydraulic lines 116 and 118 are connected with opposite ends of cylinder 106 for enabling the piston and likewise the shifter lever 112 to be shifted axially of the gear train within the housing. It will be observed that the teeth of gear 98 have an axial extent substantially greater than the teeth of gear portion 94 of sun gear 92. Thus, when hydraulic fluid under pressure is introduced into cylinder 106 through hydraulic line 116, piston 108 is shifted to the right and the teeth of the gear portion 96 are shifted axially out of engagement with the teeth of the wheel driving gear 102. A spring detent arrangement 120 is cooperable with notches 122 and 124 on rod 110 for holding the rod 110 in either of its positions.

In FIG. 7, a slightly different form of gear motor is illustrated. In this arrangement, the housing 126 supports a hydraulic motor 128 the drive shaft 130 of which has keyed thereto a drive gear 132. Gear 132 meshes with a gear 134 mounted as by screws 136 on a shaft in the form of a sleeve 138. Sleeve 138 is journalled on a shaft 140 which is likewise formed as a sleeve. At one end, shaft 140 is journalled as by bearings 142 within an opening in housing 126. At its opposite end, shaft 140 is journalled as by bearings 144 within an opening in a cover plate 146 mounted on housing 126 as by screws 148. Sleeve 138 is fashioned with an eccentric portion 150 on which is journalled as by bearings 152 a sun gear 154. Gear 154 has one portion 156 meshing with a stationary gear 158 secured to housing 126 as by screws 160 and has a second portion 162 which meshes with a gear 164 that is secured to a flange 165 at one end of sleeve 140 as by screws 166. An output shaft 168 is keyed to sleeve 140 as at 170 to rotate with the sleeve. An end cap 172 may be provided to retain lubricant within the housing or to prevent the ingress of dirt and the like.

The operation of the gear motor illustrated in FIG. 7 is generally the same as that illustrated in FIG. 4. In the case of a vehicle, the wheel (not illustrated) may be connected directly with shaft 168. The gear motor illustrated in FIG. 7 may be used in arrangements other than driving vehicle wheels. In this arrangement, the shifter rod 174 is designed to be actuated by a linkage rather than a hydraulic cylinder for engaging and disengaging the drive to shaft 168.

I claim:
1. A vehicle comprising in combination a chassis, a power plant on the chassis, a pair of axles on the chassis, wheels journalled at opposite ends of the axles, means operably connecting the power plant to each wheel independently of the axles, each wheel being pivotally supported on its axle for steering, a link interconnecting the two wheels on each axle, said link including an integral portion forming a piston, a cylinder mounted on the vehicle and in which the piston is slidably arranged whereby when hydraulic fluid under pressure is admitted to opposite ends of the cylinder, the link is shifted axially in opposite directions to turn both wheels in the same direction, said link including on opposite sides of said cylinder a piston-cylinder assembly, one member of which is connected to the adjacent wheel and the other to the first mentioned piston and means for selectively conducting fluid pressure to the opposite ends of the first cylinder and to the opposite ends of the second mentioned cylinders.

2. In a vehicle, the combination comprising a housing, a ground-engaging wheel journaled on the housing, a shaft in the housing journaled for rotation about an axis concentric with the axis of wheel rotation, a pair of axially aligned internal gears concentric with the axis of wheel rotation, one of said gears being fixed to the wheel and the other fixed to the housing, said shaft having an outer eccentric portion, a sun gear journaled on the eccentric portion of the shaft and having two axially aligned gear portions, one meshing with the internal wheel gear and another larger one meshing with the internal gear fixed to the housing, the gear ratios of said meshing gears being different so that as the sun gear revolves in response to rotation of said shaft, said wheel gear is rotated relative to the gear fixed to the housing and means for shifting the sun gear axially to displace the second gear portion from meshing relation with the wheel gear.

3. In a vehicle, the combination comprising an axle having a pair of wheels journalled thereon, each wheel being pivotally supported on the axle for steering, a link interconnecting the wheels, said link including a portion forming a piston, a cylinder mounted on the axle in axially fixed position, said piston being slidably arranged in said cylinder, said link on opposite sides of said piston including a piston-cylinder assembly for varying the length of the link between the first mentioned piston and each wheel and means for selectively directing hydraulic fluid under pressure to the opposite ends of the first mentioned cylinder and the second mentioned cylinders.

References Cited by the Examiner

UNITED STATES PATENTS

| | | | |
|---|---|---|---|
| 1,301,583 | 4/1919 | Marshall | 180—45 |
| 1,320,460 | 11/1919 | Ellett | 74—805 |
| 1,512,562 | 10/1924 | Radies | 180—45 |
| 1,646,202 | 10/1927 | Johnson | 74—805 |

(Other references on following page)

UNITED STATES PATENTS

| | | | |
|---|---|---|---|
| 1,681,893 | 8/1928 | Barshell | 180—45 |
| 2,030,441 | 2/1936 | Ganz | 280—95 |
| 2,645,298 | 7/1953 | Hawkin et al. | 180—66 |
| 2,733,771 | 2/1956 | Sullivan | 180—66 |
| 2,863,518 | 12/1958 | Pellizzetti. | |
| 3,009,712 | 11/1961 | Williams | 280—95 |
| 3,056,315 | 10/1962 | Mros | 74—805 |
| 3,087,564 | 4/1963 | Quayle | 180—79.2 |
| 3,090,456 | 5/1963 | Blenke | 180—43 |

FOREIGN PATENTS

| | | |
|---|---|---|
| 451,813 | 8/1936 | Great Britain. |
| 871,358 | 6/1961 | Great Britain. |

A. HARRY LEVY, *Primary Examiner.*